(12) United States Patent
Matsuzawa

(10) Patent No.: US 7,898,690 B2
(45) Date of Patent: Mar. 1, 2011

(54) EVALUATION OF CALIBRATION PRECISION

(75) Inventor: Yoshihiko Matsuzawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 742 days.

(21) Appl. No.: 11/900,801

(22) Filed: Sep. 13, 2007

(65) Prior Publication Data

US 2008/0259365 A1    Oct. 23, 2008

(30) Foreign Application Priority Data

Sep. 13, 2006    (JP) .............................. 2006-248467

(51) Int. Cl.
*H04N 1/40* (2006.01)
(52) U.S. Cl. .................... 358/1.9; 358/504; 358/468
(58) Field of Classification Search .................. 358/1.9, 358/2.1, 500, 504, 400, 406, 468, 527
See application file for complete search history.

(56) References Cited

U.S. PATENT DOCUMENTS 7,345,798 B2 *  3/2008  Kondo .......................... 358/523

FOREIGN PATENT DOCUMENTS

| JP | 10-145598 A | 5/1998 |
|---|---|---|
| JP | 2005-178180 | 7/2005 |
| JP | 2005-204053 | 7/2005 |
| JP | 2005-305864 | 11/2005 |
| JP | 2006-209407 A | 8/2006 |

* cited by examiner

*Primary Examiner*—Thomas D Lee
*Assistant Examiner*—Stephen M Brinich
(74) *Attorney, Agent, or Firm*—Nutter McClennen & Fish LLP; John J. Penny, Jr.

(57) ABSTRACT

A calibration precision evaluating apparatus includes a calibrator carrying out calibration to adjust an ink amount output characteristic so that a measured color value is approximated to a reference value, a confirmation patch maker printing plural confirmation patches including a background patch and having the known reference values corresponding to the confirmation patches, a color measurer color-measuring the confirmation patches, acquiring initial color measured values, a background color shift amount calculator calculating a first amount of background color shift between the reference values and the initial color measured values with respect to the background patches, a corrector correcting the initial color measured values based on the background color shift amounts, acquiring corrected color measured values, and a precision evaluator carrying out precision evaluation of the calibration based on a second amount of color shift between the corrected color measured values and the reference values with respect to the confirmation patches.

8 Claims, 8 Drawing Sheets

EVALUATION OF CALIBRATION PRECISION

CROSS-REFERENCE TO RELATED APPLICATIONS

The entire disclosure of Japanese Patent Application No. 2006-248467, filed Sep. 13, 2006 is expressly incorporated by reference herein.

BACKGROUND OF THE INVENTION

1. Field of the Invention

The present invention relates to evaluation of calibration precision.

2. Description of the Related Art

Printer calibration is carried out to compensate for the difference in color reproducibility between printer bodies. More specifically, calibration is carried out by adjusting an ink output characteristic so that reproduced colors of the machine to be calibrated are approximated to reproduced colors of the standard machine (see JP-A-2005-204053). In such case, patches of plural colors are printed, and an amount of shift of measured values of the patches from target reference values is grasped. The ink output characteristic is corrected so that the shift amount is compensated for. Such calibration can conform the reproduced colors of the machine to be calibrated to the reproduced colors of the standard machine. However, when calibration has not been carried out properly, there is a possibility that an amount of color shift may be produced between the reproduced colors of the machine to be calibrated and the reproduced colors of the standard machine. Due to this, patches for precision confirmation are printed by the machine which has been calibrated so that measured color values are evaluated, whereby calibration precision is evaluated.

However, calibration precision cannot properly be grasped unless printing/color measuring conditions for the patches used in the calibration correspond with printing/color measuring conditions for the patches used to confirm calibration precision. More specifically, when both printing/color measuring conditions differ from each other, evaluation of calibration precision reflects color shifts resulting from the differences of the printing/color measuring conditions. As a result, true evaluation of calibration precision cannot be carried out. For example, print sheet of the patches used in the calibration differs from print sheet of the patches to confirm calibration precision, a measured color value of each patch reflects the differences of background-colors of the print sheets, whereupon it is difficult to carry out true evaluation of calibration precision. It is obviously desirable to completely conform the printing/color measuring conditions for the patches used in the calibration to the printing/color measuring conditions for the patches used to confirm calibration precision. However, it is difficult to familiarize users with the complete correspondence.

SUMMARY

The present invention discloses calibration precision evaluation apparatus comprising: a calibrator carrying out calibration to adjust an ink amount output characteristic so that a measured color value is approximated to a reference value; a confirmation patch maker printing a plurality of confirmation patches including a background patch with a dot recording rate of zero and having the reference values which correspond to the respective confirmation patches and are known; a color measurer color-measuring the confirmation patches, thereby acquiring respective initial color measured values; a background color shift amount calculator which calculates a first amount of background color shift between the reference values and the initial color measured values with respect to the background patches respectively; a corrector which corrects the initial color measured values of the confirmation patches based on the background color shift amounts, thereby acquiring corrected color measured values, respectively; and a precision evaluator carrying out precision evaluation of the calibration based on a second amount of color shift between the corrected color measured values and the reference values with respect to the confirmation patches, respectively.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

Other objects, features and advantages of the present invention will become clear upon reviewing the following description of the embodiment with reference to the accompanying drawings, in which.

DESCRIPTION OF THE EXEMPLARY EMBODIMENTS

Embodiments of the present invention will be described in the following order:

A. Arrangement of Calibration System;
B. Calibration Process;
C. Calibration Precision Evaluation Process; and
D. Summary

A. Arrangement of Calibration System

Figure 1:
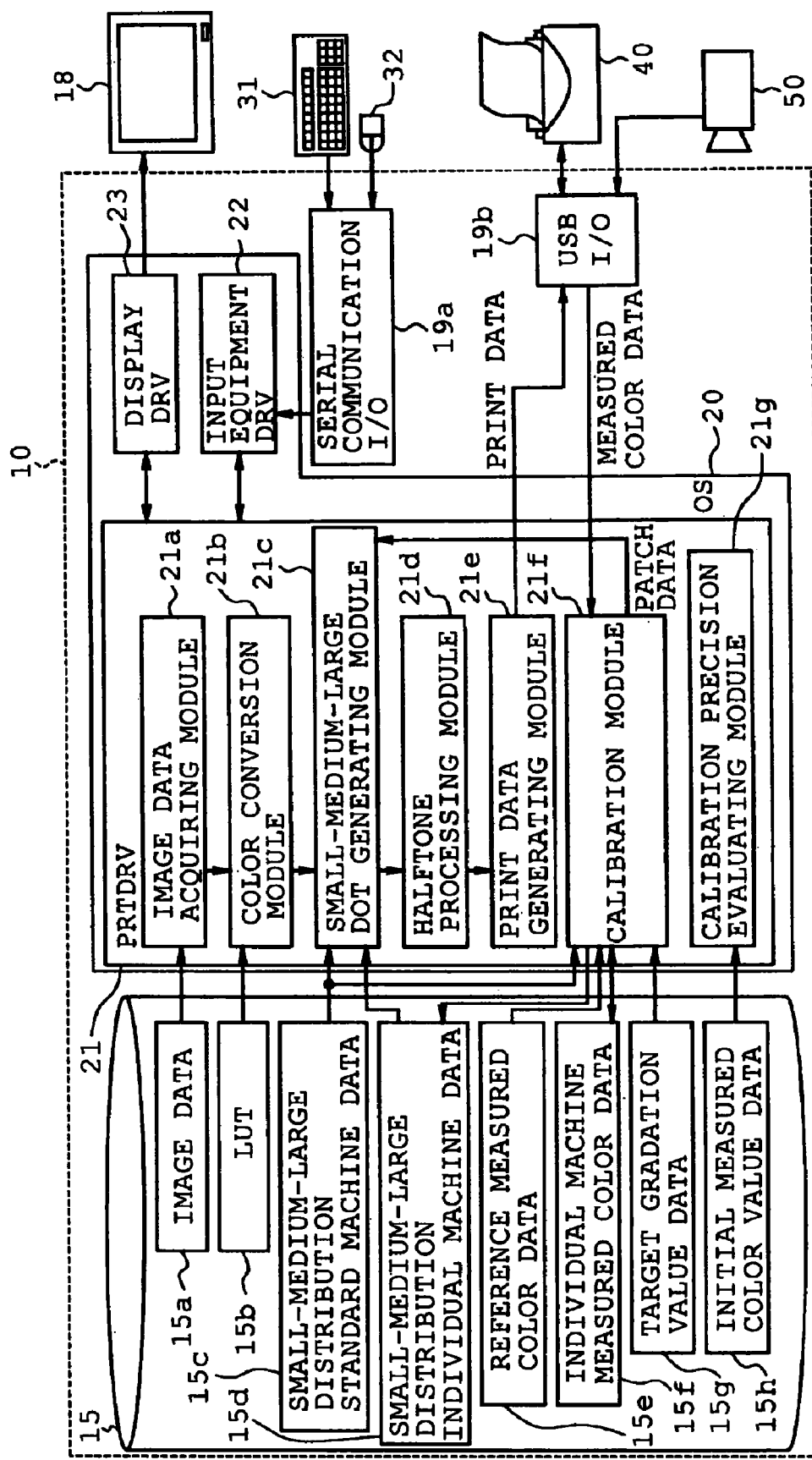
FIG. 1 is a block diagram showing a schematic configuration of the calibration system.

FIG. 1 is a block diagram showing a schematic arrangement of a computer 10 serving as the center of a calibration system including a calibration precision evaluating apparatus in accordance with the present invention. The computer 10 includes a central processing unit (CPU) serving as the center of computation of the computer 10, and a read only memory (ROM), a random access memory (RAM) both serving as storage media and the like although none of these devices are shown. The computer 10 can carry out a predetermined program while using peripheral equipment such as a hard disc drive (HDD) 15. Operation input devices such as a keyboard 31, a mouse 32 and the like are connected via a serial communication input/output (I/O) 19a to the computer 10. A display 18 is also connected via a video board to the computer 10. Furthermore, a printer 40 is connected via a USB I/O 19b to the computer 10. A color measurer 50 is further connected via the USB I/O 19b to the computer 10. The printer 40 is provided with ink cartridges filled with a plurality of colored inks respectively. This mechanism is loaded with cartridges of inks of CMYKlclm. These colored inks are combined with each other or one another in the printer 40 so that a number of colors can be formed, whereby a color image is formed on a print medium. Furthermore, the printer 40 is capable of ejecting ink drops each with three different amounts of ink such that representation of four tones can be realized for every pixel. It is noted that each ink drop is called "small-medium-large dot" with the size of ink drop being focused in the present specification.

Printed matter is irradiated by a light source with known spectral distribution in the color measurer 50 so that a spectral reflection factor of the printed matter is detected by the color measurer, thereby being capable of delivering a color value thereof. A CIELAB value (L*a*b*; and the symbol * will hereinafter be eliminated) of the patch printed by the printer 40 is color-measured such that obtained color measurement data is delivered to the USB I/O 19b. In the computer 10, a printer driver (PRTDRV) 21, an input device driver (DRV) 22 and a display driver (DRV) 23 are incorporated into an operating system (OS) 20. The display DRV 23 controls display of an image on the display 18 and a property screen of the printer or the like. The input device DRV 22 receives a cord signal input via the serial communication I/O 19a from the keyboard 31 or mouse 32, thereby accepting a predetermined input operation.

The PRTDRV 21 carries out predetermined processing for an image which has been instructed to be printed or an image of patch which will be described later, thereby executing printing. The PRTDRV 21 includes an image data acquiring module 21d, a color converting module 21b, a small-medium-large dot generating module 21c, halftone processing module 21d and a print data generating module 21e all for execution of printing. Upon the aforesaid instruction of printing, the PRTDRV 21 is driven to deliver data to the display DRV 23 so that a user interface (UI; and not shown) is displayed which allows to be input information indicative of print conditions such as printed medium, image quality, printing speed and the like and instructions for execution of calibrating operation.

The keyboard 31, mouse 32 and the like are operated so that the user enters information necessary for printing using UI. When the user then instructs execution of printing, each module of the PRTDRV 21 starts up to carry out processing for data of each pixel of image data, whereby image data is generated. Generated image data is delivered via the USB I/O 19b to the printer 40, which carries out printing based on the print data. More specifically, the image data acquiring module 21a acquires image data 15a indicative of an image to be printed. The image data 15a is dot-matrix data defining the color of each pixel by grayscale representation of each color component of RGB. The image data 15a employs a color coordinate system in compliance with a standard RGB (sRGB) in the embodiment.

The color converting module 21b converts the color coordinate system indicative of the color of each pixel. The color converting module 21b converts the sRGB color system of the image data 15a to a CMYKlclm color system having components of ink colors of the printer 40. A Look-Up Table (LUT) 15b represents colors both by the sRGB color system and by the CMYKlclm color system and causes the colors by both systems to correspond with each other, thereby describing correspondence relationship about a plurality of colors. Furthermore, regarding any color represented by the sRGB color system, a color of the CMYKlclm color system corresponding to the any color can be computed by interpolation while a peripheral color which is represented by the sRGB color system and defined in the LUT 15b, whereby color conversion can be carried out.

Furthermore, data of the CMYKlclm color system is obtained by representing each color of the CMYKlclm color system into 256 gray scale images. Each gradation value corresponds to an amount of ink of each pixel and each color. More specifically, gradation value 0 represents a condition where no color ink is recorded. Gradation value 256 represents a condition where each color ink is recorded to the maximum. The small-medium-large dot generating module 21c converts CMYKlclm data of 256 gray scale into data indicative of a recorded amount of small-medium-large dot for every color. More specifically, the HDD 15 is recorded with small-medium-large distribution standard machine data 15c in which each CMYKlclm gradation value and a gradation value indicative of a recorded amount of small-medium-large dot correspond to each other. The small-medium-large dot generating module 21c refers to the small-medium-large distribution standard machine data 15c to convert each CMYKlclm gradation value into a gradation value of small-medium-large dot for every color.

The small-medium-large dot has a larger number of gradation scales than the CMYKlclm color system and is represented by 12 bit (0 to 4095). In the small-medium-large dot, gradation value "0" can indicate the state that none of the small, medium and large dots are recorded, whereas gradation value "4095" can indicate the state that each of small, medium and large dots is recorded to a maximum extent, for example. Small-medium-large dot distribution standard machine data 15c is determined for a standard printer. More specifically, a standard machine is prepared at a manufacturing stage of the printer 40. An ink output characteristic is adjusted so that output colors of the individual printers 40 are substantially equivalent to output colors of the standard machine when printing has been carried out with reference to the small-medium-large dot distribution standard machine data 15c. The small-medium-large dot distribution standard machine data 15c is recorded on a predetermined recording medium upon shipment of the individual printers 40. When to be installed on the computer 10, the data 15c is copied from the recording medium onto HDD 15. The small-medium-large distribution standard machine data 15c is referred to in the initial state of the printer 40. However, small-medium-large distribution individual machine data 15d is referred to after a calibration process which will be described later.

Figure 2:
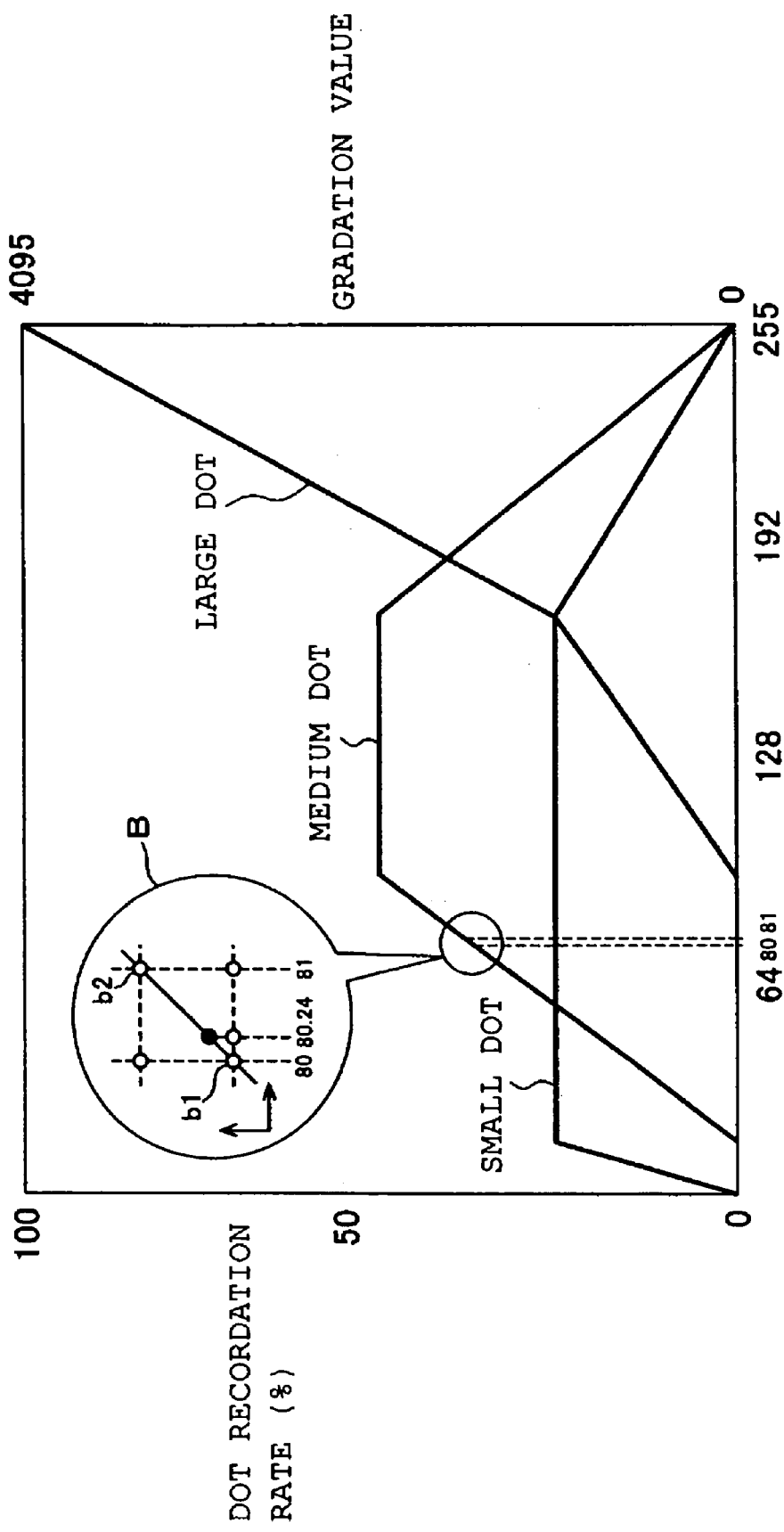
FIG. 2 illustrates an example of small-medium-large sorting standard machine data.

FIG. 2 illustrates an example of the small-medium-large distribution standard machine data 15c with respect to a certain color. An axis of abscissas represents a gradation value of CMYKlclm, whereas an axis of ordinates represents an amount of recordation of ink drop of each of small, medium and large dots. FIG. 2 represents an amount of recordation of ink both by a gradation value and by a dot record ratio (%). The right axis of ordinates represents a 12-bit gradation value (0 to 4095) and the left axis of ordinates represents a dot record ratio. The dot record ratio means a ratio of pixels for which dots are formed to pixels within a uniform area when the uniform area is reproduced according to constant gradation values.

While referring to gradation values of small, medium and large dots generated as described above, the halftone processing module 21d generates halftone image data specifying ejection/non-ejection of ink and an amount of ink (any one of small, medium and large) to be ejected for every pixel in order that record according to an amount of ink corresponding to each gradation value. The print data generating module 21e receives the halftone image data, rearranging the data into an order in which the data is used in the printer 40. The module 21e delivers to the serial printer 40 a unit of data to be used in each time of main scan. The print data generating module 21e generates print data by adding information about image resolution etc. to the rearranged data, delivering the generated print data via the USB I/O 19b to the printer 40. When the print data has been transferred to the printer 40, an image is formed on a print medium by the printer 40.

In the arrangement and construction for carrying out printing in a manner as described above, there is a case where aged deterioration of printer 40 or the like causes output colors of the individual printer 40 to shift from the output color of standard printer 40. The user of the computer 10 can instruct using a UI to carry out calibration processing which resolves the color shift. The small-medium-large distribution individual data 15d is generated as the result of processing by the calibration module 21f, thereby being recorded on the HDD 15. After the small-medium-large distribution individual data 15d is recorded, the small-medium-larger dot generating module 21c determines the gradation values of small, medium and large dots with reference to the small-medium-large distribution individual data 15d. Consequently, printing can be carried out with the color shift having been compensated. The calibration precision evaluating module 21g carries out processing to evaluate calibration precision after the calibration. Processes carried out by the calibration module 21f and the calibration precision evaluating module 21g will be described in detail later.

Figure 3:
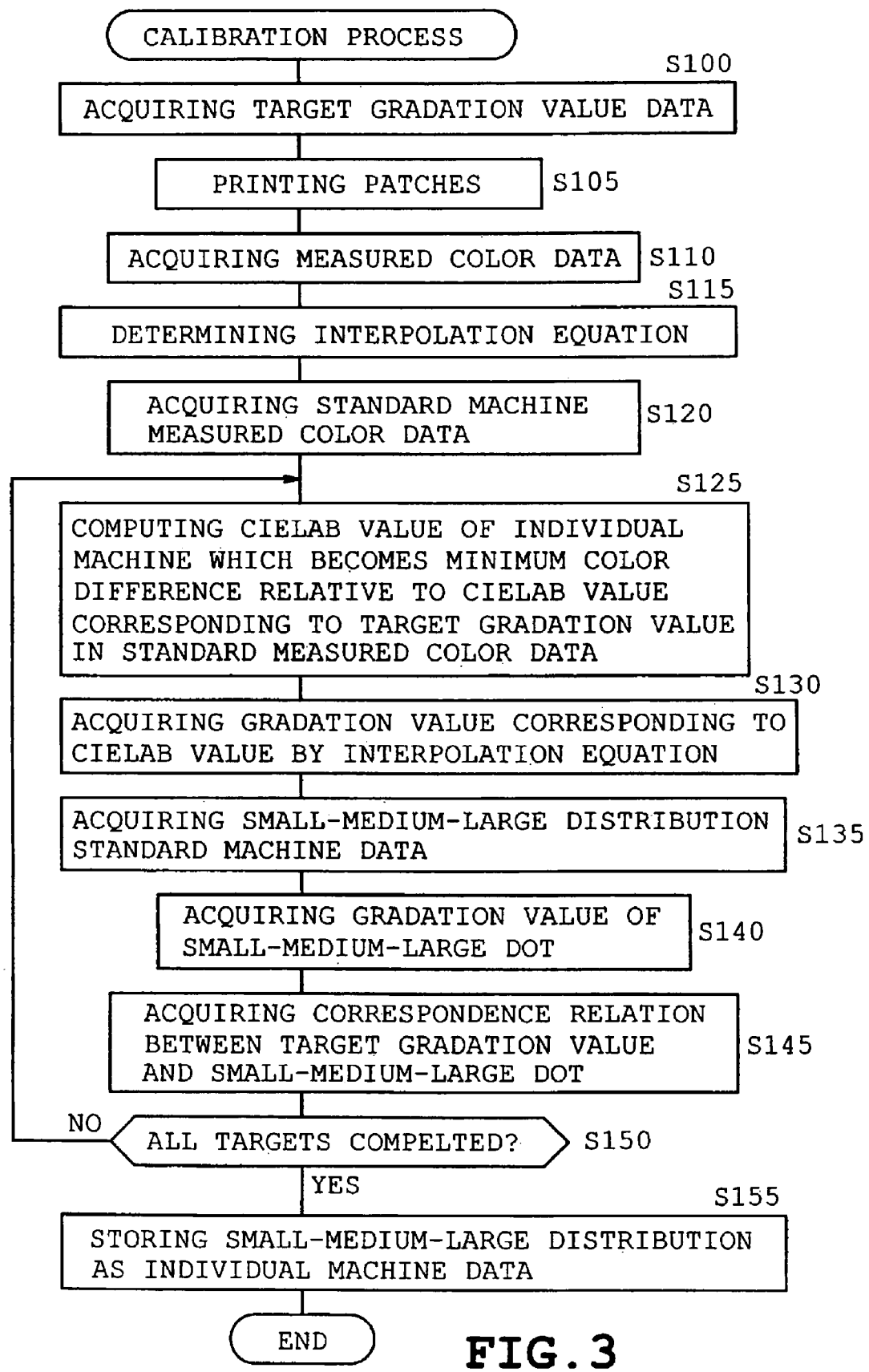
FIG. 3 is a flowchart showing calibration process.

B. Calibration Process:

The aforenoted calibration process will now be described in detail with reference to the flowchart of FIG. 3. The PRT-DRV 21 is provided with the calibration module 21f. Execution of calibration can be instructed on a property screen of the printer, whereby the calibration module 21f can start. Upon start of the calibration module 21f, target gradation value data 15g is acquired from the HDD 15 at S100. At S105, a gradation value of each ink color is grasped from the target gradation value data 15g and generates patch data for carrying out printing with the obtained gradation value, printing patches. More specifically, the patch data is delivered to the small-medium-large dot generating module 21c, which generates patch data representing patch colors at gradation values of small-medium-large dots while referring to the delivered patch data and small-medium-large distribution standard machine data 15c. The patch data is converted by processing by the halftone processing module 21d and print data generating module 21e into print data, whereupon a plurality of patches are printed.

Figure 4:
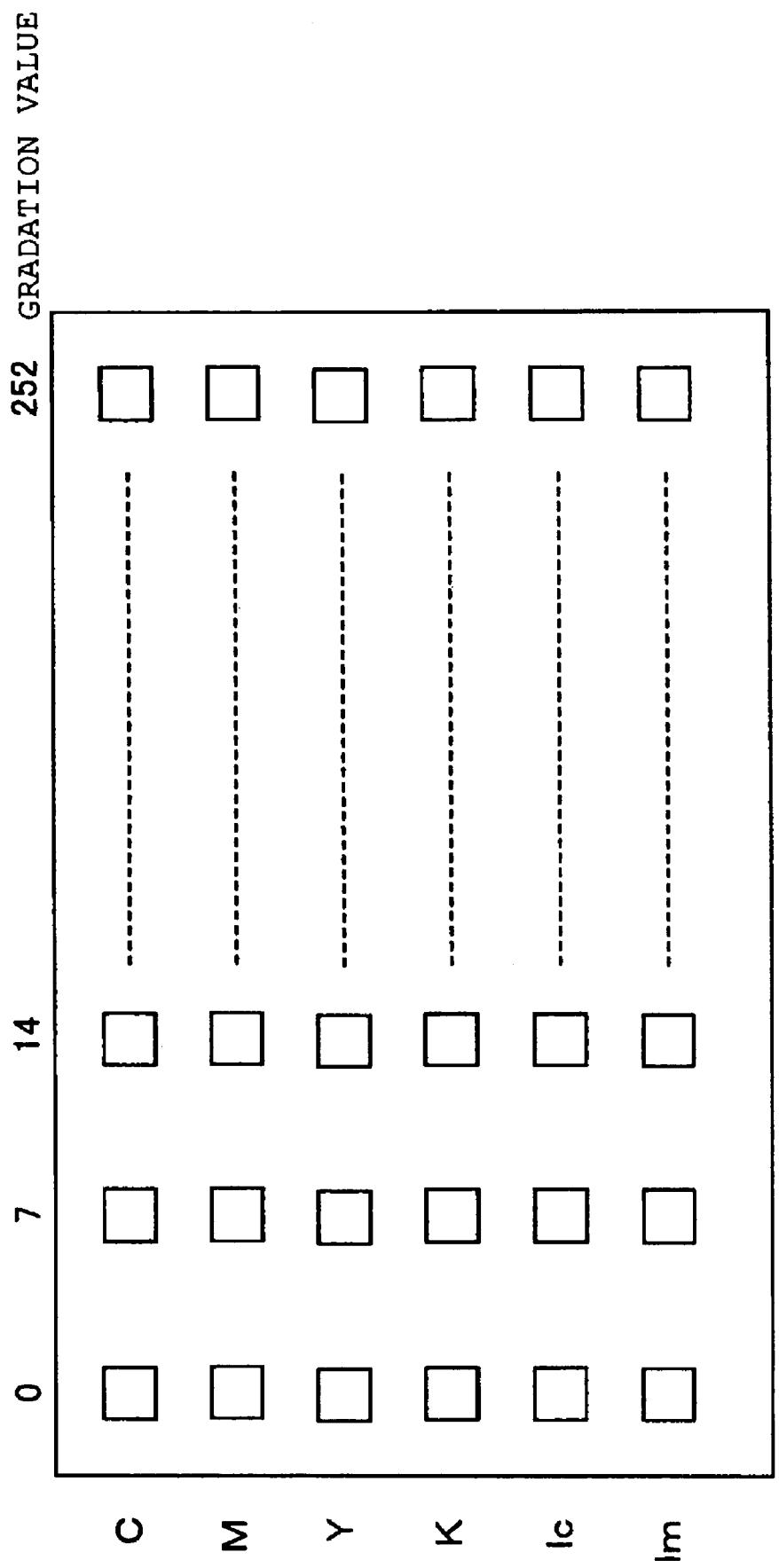
FIG. 4 illustrates examples of calibration patches and confirmation patches.

FIG. 4 illustrates a plurality of calibration patches printed. In the figure, a print medium is shown in a large rectangular form. The gradation value is shown on an upper side and an ink color is shown on a left side. Since an amount of ink is increased with increase in the gradation value, the left-hand patch is brightest and the patches become darker as they go rightward. More specifically, a patch is printed which is indicative of the gradation of primary color (two or more inks are not mixed) with respect to each ink. In the target gradation value data 15g, a plurality of gradation values are extracted substantially at uniform intervals over the entire gradation sequence of CMYKlclm. The target gradation value data 15g is recorded on a predetermined hard disc drive (HDD) 15. Furthermore, at least one background patch is formed whose small-medium-large ink gradation value is 0 and whose dot record rate is 0 on the print medium.

The user carries out color measurement for each printed patch using a color measurer 50. The calibration module 21f delivers control data for delivering color measurement data via the USB I/O 19b at S110. The color measurer 50 delivers color measurement data indicative of a CIELA value of each pad according to the control data. The calibration module 21f acquires color measurement data as the result of color measurement by the color measurer 50, recording the acquired data as individual measured data on the HDD 15. More specifically, individual machine color measurement data 15f refers to color measurement data indicative of color value (CIELAB value or the like) acquired by color measurement of the patches as shown in FIG. 4. The calibration module 21f compares the individual machine color measurement data 15f with reference color measurement value data 15e corrects the gradation values of small-medium-large dots so that colors to be output are approximated to the colors to be output in target gradation value data 15g (colors the standard machine generates based on the target gradation value data 15g), thus generating small-medium-large distribution individual machine data 15d. Firstly at S115, an interpolation function is computed for obtaining CIELAB value relative to any CMYKlclm gradation value in an individual printer.

The aforesaid interpolation function is formed with reference to the correspondence between the plural target gradation values as shown in the individual machine color measurement data 15f and the CIELAB values. This interpolation function provides approximate description of correspondence between each target gradation value and CIELAB value. This function may be in the form of high-dimensional function with gradation or CIELAB value serving as a parameter. Furthermore, the degree of change may be rendered as smooth as possible so that error in the color measurement is prevented from being reflected in color measurement data. When the interpolation function has been obtained, data indicative of the interpolation function is stored on RAM (not shown) or the like.

Reference color measurement value data 15e which is stored on the HDD 15 is acquired at S120. At S125 to S145, the color to be output on the basis of a target gradation value is specified, and a CIELAB value is computed which is provided for outputting a color to be output on the individual printer 40. Furthermore, small-medium-large dot gradation values used to obtain output of CIELAB value are acquired. The acquired small-medium-large dot gradation values are caused to correspond to the target gradation value. More specifically, at S125, the reference color measurement value data 15e is referred to so that the CIELAB value corresponding to a target gradation value is obtained. At S125 to S150, processing is carried out with the target gradation value serving as an object to be processed. At S125, one of CIELAB values obtained by the interpolation function is acquired. The CIELAB value with the minimum color difference from the acquired value is computed. In other words, a color is obtained that is the nearest to an output color at the target gradation value in the reference color measurement value data 15e and that is capable of being output by the individual printer 40. The color is obtained for every ink color.

Figure 5:
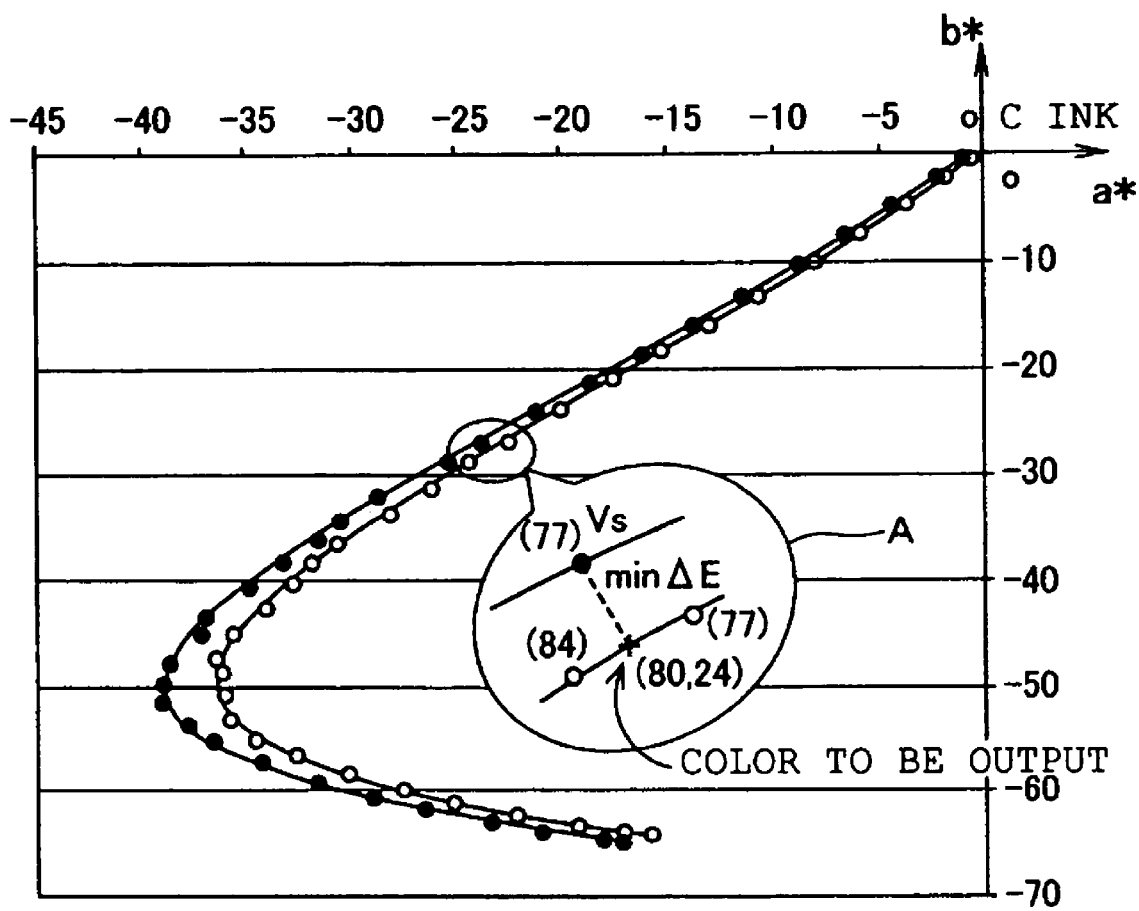
FIG. 5 explains processing in correcting colors.

FIG. 5 explains processing in correcting colors. The axis of abscissas indicates value a in an Lab color space, whereas the axis of ordinates indicates value b. More specifically, the CIELAB value in the Lab color space which is a three-dimensional color space is projected on the a-b plane. Furthermore, FIG. 5 shows a state that a color value of C ink is plotted as an example. Open circles in FIG. 5 designate projection values of the individual machine color measurement data 15f and are color values corresponding to the gradation values "7, 14, . . . , 252" arranged along a curve sequentially from the open circle near to the origin O. Black circles in FIG. 5 designate projection values of the reference color measurement value data 15e and are color values corresponding to the gradation values "7, 14, . . . , 252" arranged along a curve sequentially from the black circle near to the origin O.

In enlarged part A of FIG. 5, the open circles shown as the individual machine color measurement data 15f are the CIELAB values of the colors to be printed by target gradation values "77" and "84" by the individual printer 40. Curve near to the gradation values is the projected CIELAB value obtained by the interpolation function. In the same way, the black circle shown as the reference color measurement value data 15e is the CIELAB value (reference value: Vs) of the color to be printed by the target gradation value "77" by the standard printer. When color is output by the individual printer 40 while the gradation value is changed for every color, the CIELAB value is substantially equal to the CIELAB value obtained by the interpolation function (located on the projected curve in FIG. 5). Accordingly, in order that color shift may be resolved by correction for every color, the CIELAB value approximate to the value Vs as much as possible is extracted from the CIELAB values computed by the interpolation function. For this purpose, at S125, the CIELAB value is computed which is obtained by the interpolation function and which has the minimum color difference (min $\Delta E$) relative to the value Vs.

At S130, a gradation value is obtained which corresponds to the CIELAB value and has the minimum color difference based on the interpolation function. In the example as shown in FIG. 5, the gradation value is 80.24. Since the interpolation function is continuously defined, a value equal to or smaller than integer value can be defined. Accordingly, the gradation values including values after the decimal point are computed. At this time, it is found that the gradation value should be corrected by 3.24 into 80.24 in order that the color to be output with an amount of correction of the gradation value in the individual printer 40, that is, at the target gradation value 77. When the gradation value is found, the reference color measurement value data 15e is obtained at S135. The gradation values of small-medium-large dots corresponding to the gradation value are acquired at S140. At S145, the gradation values of small-medium-large dots and the target gradation values used in S125 and subsequent steps are caused to correspond to each other and then stored on RAM (not shown). In short, the target gradation values are caused to correspond to the gradation values of small-medium-large dots so that ink drops are output based on the gradation values of small-medium-large dots obtained at S140.

When the gradation values of small-medium-large dots and the target gradation values are caused to correspond to each other, it is determined at S150 whether processing has been completed with all of the plural target gradation values serving as processing objects. The processing at S125 and subsequent steps is repeated until it is determined that processing has been completed with all of the plural target gradation values serving as processing objects. When it is determined that processing has been completed for all the target gradation values, the correspondence relationship stored on the RAM is stored as small-medium-large distribution individual machine data 15d on the HDD 15. In the small-medium-large distribution individual machine data, the plural target gradation values and small-medium-large dot gradation values are caused to correspond to each other for every color. According to the corresponding small-medium-large dot gradation values, a color approximated to the color to be output based on the target gradation value as much as possible can be output.

Figure 6:
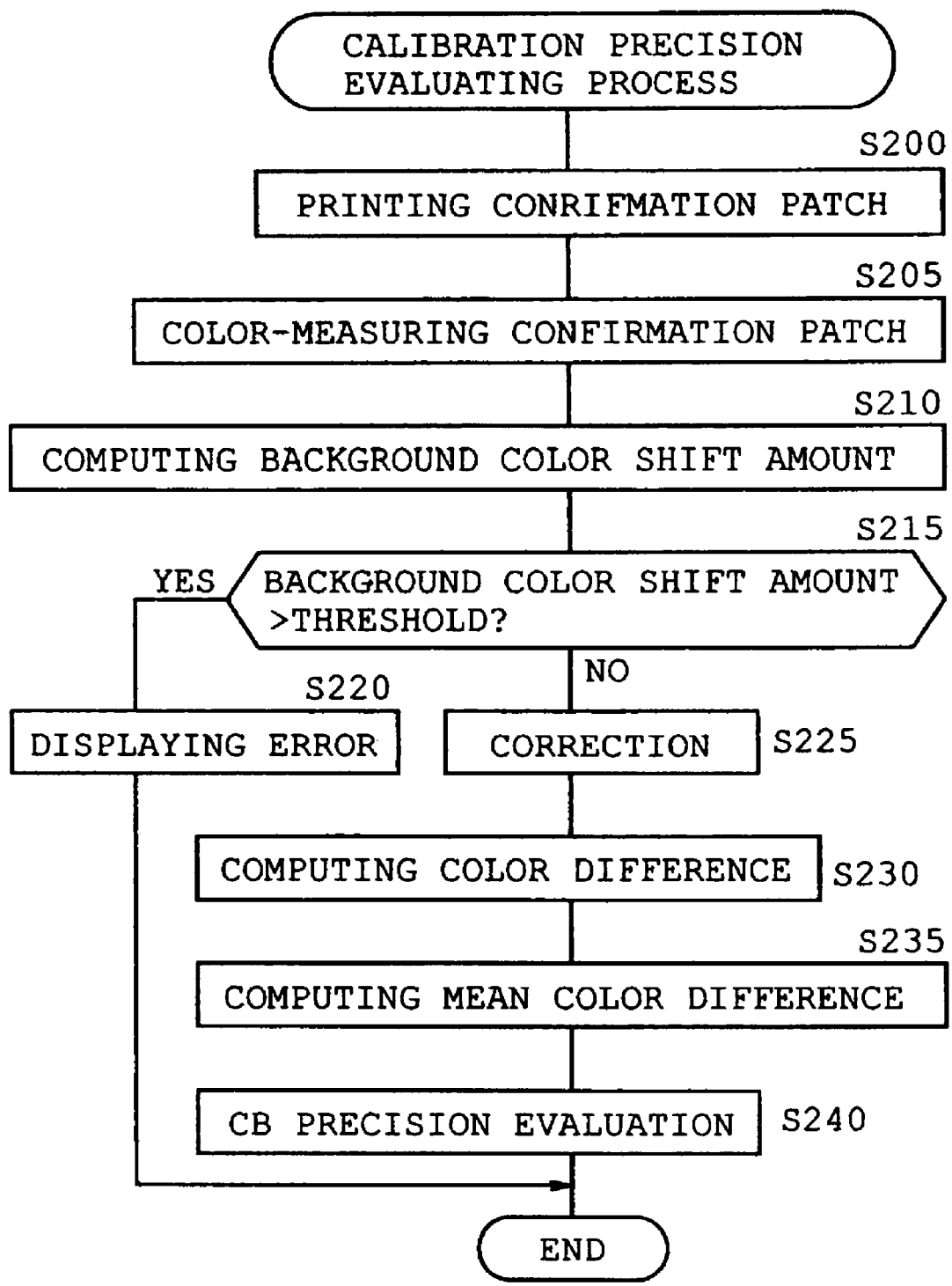
FIG. 6 is a flowchart showing a calibration precision evaluation process.
Figure 7A:
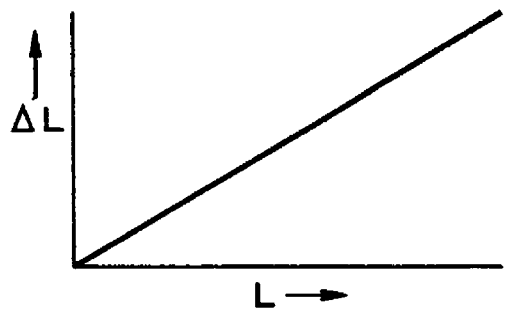
FIGS. 7A to 7E are graphs showing a tendency of an amount of color shift due to difference of mats.
Figure 7B:
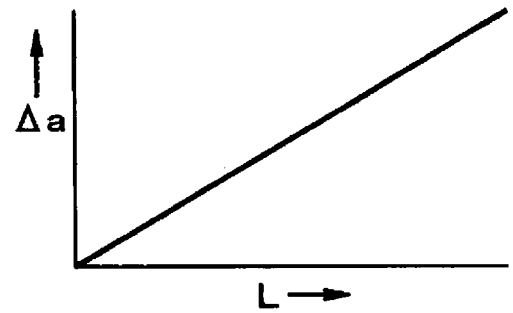
Figure 7C:
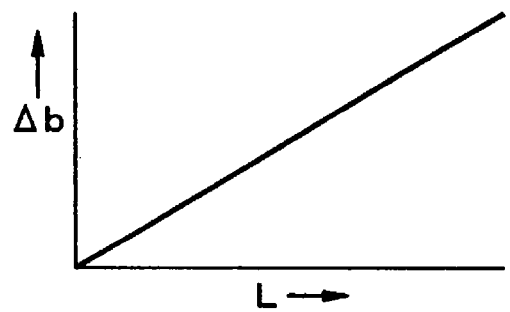
Figure 7D:
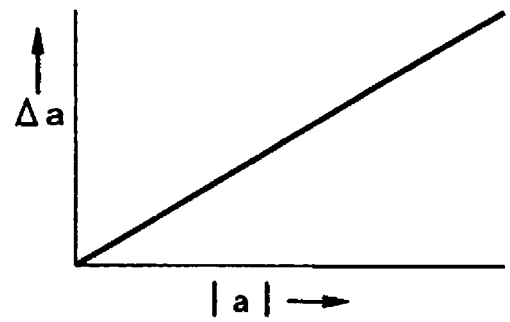
Figure 7E:
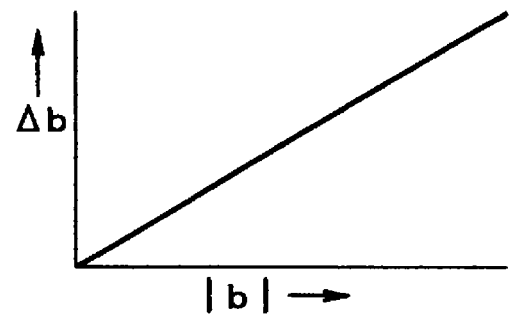

C. Calibration Precision Evaluation Process:

FIG. 6 is a flowchart showing a calibration precision evaluation process. At S200, confirmation patches are printed based on the target gradation value data 15g. The confirmation patches are similar to the calibration patches including the background patch as shown in FIG. 4. Since the above-described calibration has been accomplished, the colors of confirmation patches printed based on the target gradation value data are ideally considered to have values approximated to the reference color measurement value data 15e. In other words, the calibration carried out immediately before evaluation is determined to have a better precision as the color of the confirmation patch is as close as possible to the reference color measurement value data 15e. At S205, the confirmation patches are color-measured by the color measurer 50. The calibration precision evaluation module 21g stores on the HDD 15 color measurement data indicative of color values corresponding to the respective patches as initial color measurement value data 15h.

At S210, the calibration precision evaluation module 21g computes an amount of color difference (amount of background color difference) between background patch color values $Lraw_0$, $araw_0$ and $braw_0$ in the initial color measurement value data 15h and the background patch reference color measurement values $Lstd_0$, $astd_0$ and $bstd_0$ in the reference color measurement value data 15e. Since the color values are grasped by the CIELAB values, amounts of background color shift $Ldif_0=Lstd_0-Lraw_0$, $adif_0=astd_0-araw_0$ and $bdif_0=bstd_0-braw_0$ are computed as the differences with respect to L, a and b components. Upon computation of the background color shift amount, a threshold value of the background color shift amount is determined. When it is determined that the absolute value of $Ldif_0$ is larger than a threshold value 1.5, the absolute value of $adif_0$ is larger than a threshold value 0.8 or the absolute value of $bdif_0$ is larger than a threshold value 0.8, it is determined at S220 that the relation is abnormal. The calibration precision evaluation module 21g delivers data to the display 18 so that the display 18 displays error message.

The dot record rate of each ink is 0 in the background patch, and the measured values are prevented from being influenced by the calibration. On the other hand, when the confirmation patch is printed/color-measured under the condition different from the condition on which the reference color measurement value data 15e is based, the resultant influence is reflected on measured color value of the background patch. Accordingly, when any one of the background color shift amounts is larger than the threshold value, it can be considered that print/color measurement condition of the confirmation patch is improper, for example, different type of print paper or the like, rather than low calibration precision. Consequently, in the error display at S220, for example, reprint/color remeasurement of the confirmation patch is stimulated. Although the background patch is formed so that the dot record rate of each ink is 0, only colored patches are formed and color measurement may be carried out for the blank space.

When the background color shift amount is smaller than each threshold value, the calibration precision evaluation module 21g corrects the initial color measurement value data 15h. When each background color shift amount is smaller than the threshold value, it can be considered that the background color shift amount is influenced by the difference between a mat in the color measurement and a mat on which the reference color measurement value data is based. In the embodiment, a suitable correcting technique is applied in order that color shift of each confirmation patch due to the influence of difference in mats may be compensated for. More specifically, correction is carried out using the following equations (1) to (3):

$$L\,\text{mod}_i = L\text{raw}_i + \text{dif}_0 \times (L\text{raw}_i / L\text{std}_0) \quad (1)$$

$$a\,\text{mod}_i = a\text{raw}_i + a\text{dif}_0 \times (L\text{raw}_i / L\text{std}_0) \times |a\text{raw}_i| / A \quad (2)$$

$$b\,\text{mod}_i = b\text{raw}_i + b\text{dif}_0 \times (L\text{raw}_i / L\text{std}_0) \times |b\text{raw}_i| / B \quad (3)$$

where Lraw, araw and braw are color values (initial measured color values) prior to correction, Lmod, amod and bmod are color values (corrected measured color values) after correction, and suffix i indicates ID number of confirmation patch and i=0 corresponds to a paper patch. A and B are constants depending upon print paper, ink type and the like. For example, A=50 and B=80. The above equation (1) denotes a correction equation of luminance L component and the above equations (2) and (3) denote correction equations of components a and b respectively. According to the above equations (1) to (3), amounts of correction are increased or decreased according to color shift amounts of background patches $L\text{dif}_0$, $a\text{dif}_0$ and $b\text{dif}_0$ relative to the initial measured color values $L\text{raw}_i$, $a\text{raw}_i$ and $b\text{raw}_i$ prior to correction respectively. As a result, corrected measured color values $L\text{mod}_i$, $a\text{mod}_i$ and $b\text{mod}_i$ are computed. A correction factor ($L\text{raw}_i/L\text{std}_0$) according to the luminance $L\text{raw}_i$ to be corrected is accumulated in a term indicative of each correction amount in each of the equations (1) to (3). According to the correction factor, an amount of correction can be rendered larger as the luminance $L\text{raw}_i$ is increased. Furthermore, correction factors $|a\text{raw}_i|/A$ and $|b\text{raw}_i|/B$ according to the absolute values of $a\text{raw}_i$ and $b\text{raw}_i$ to be corrected are accumulated in terms indicative of correction amounts in the equations (2) and (3) respectively. According to each of the correction factors, an amount of correction can be rendered larger as an absolute value of each of $a\text{raw}_i$ and $b\text{raw}_i$ or a saturation component is increased.

FIGS. 7A to 7E are graphs showing the results obtained from an examination of a tendency in variation of a color shift amount relative to each component Lab, the color shift amount resulting from difference of mats during color measurement. As shown, each of the color shift amounts ΔL, Δa and Δb of the components has a characteristic that each of amounts ΔL, Δa and Δb is increased in proportion to the luminance component L. Amounts Δa and Δb are also increased in proportion to saturation components |a| and |b| respectively. Consequently, color shift due to difference in mats can precisely be compensated by the aforesaid equations (1) to (3). At S225, correction by the equations (1) to (3) is applied to all initial measured color value data 15h (initial measured color values ($L\text{raw}_i$, $a\text{raw}_i$ and $b\text{raw}_i$), whereupon corrected measured color values $L\text{mod}_i$, $a\text{mod}_i$ and $b\text{mod}_i$ are obtained for all the confirmation patches respectively. At S230, the calibration module computes color differences $\Delta E_i$ between the corrected measured color values $L\text{mod}_i$, $a\text{mod}_i$ and $b\text{mod}_i$ and reference measured color values $L\text{std}_i$, $a\text{std}_i$ and $b\text{std}_i$ of confirmation patches defined by the reference measured color value data 15e respectively. The color difference ΔE can be obtained using CIE1976, CIE1994, CIE2000 color-difference formula or the like. At S235, the calibration precision evaluation module 21g arithmetically averages the color differences $\Delta E_i$ of all confirmation patches, thereby computing average color difference ΔEave. At step S240, the calibration precision evaluation module 21g compares the average color difference ΔEave with predetermined threshold values T1, thereby evaluating calibration precision.

Figure 8:
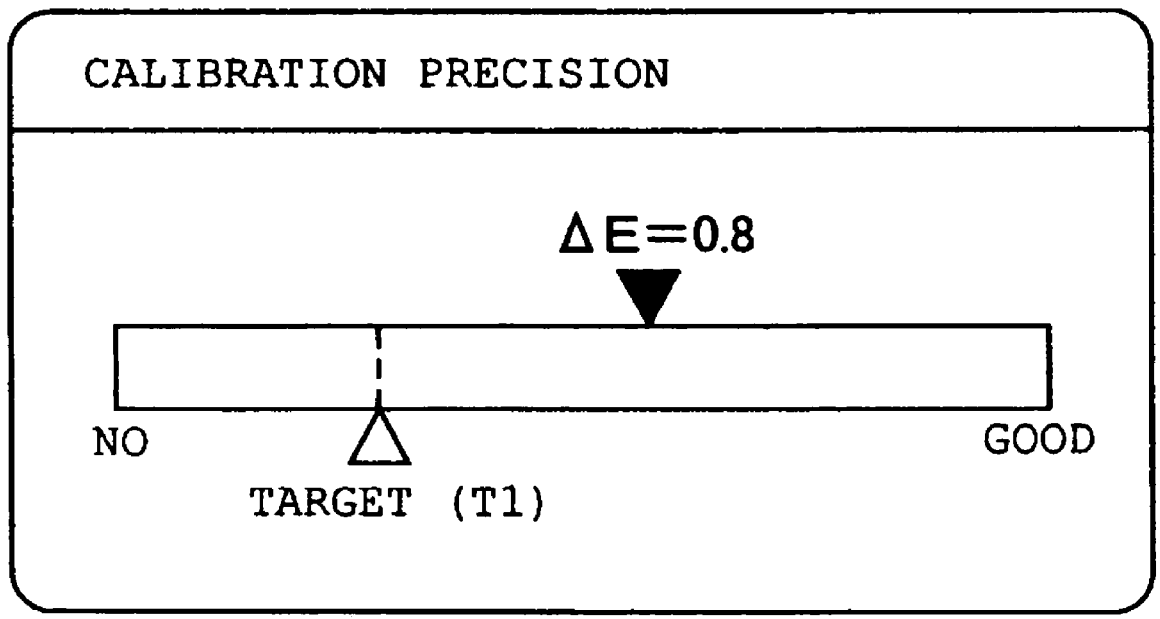
FIG. 8 illustrates a user interface (UI) screen showing the results of calibration precision evaluation.

FIG. 8 illustrates an exemplified user interface (UI) screen showing the results of calibration precision evaluation. The calibration precision evaluation module 21g carries out evaluation of calibration precision, thereby delivering data for displaying a UI screen on the display 18. In the figure, symbol "▲" designates an average color difference so that the degree of average color difference ΔE can sensuously be grasped. The threshold T1 is also shown in the figure so as to be comparable with the average color difference ΔE, whereupon it can readily be visually recognized whether the calibration precision meets a target. An average color difference ΔE before calibration is also computed in order that the results of calibration may be understandable. The average color difference ΔE before calibration may be displayed so as to be comparable. The threshold value T1 is preferably set according to a target color precision, for example, T1=1.15. Since each confirmation patch is formed by a single color ink in the embodiment, the color difference tends to be smaller than color difference of actual color image in the case where the inks are mixed with each other. Accordingly, when the threshold value is set as T1=1.15, the color difference ΔE in the actual color image can be determined to be about 1.15. Of course, a plurality of threshold values may be provided so that the calibration precision is displayed in a plurality of degrees.

D. Summary

As obvious from the foregoing, an amount of color shift due to difference of mats is compensated by the above equations (1) to (3) independently of the calibration precision, whereupon the calibration precision can truly be evaluated. Furthermore, since the calibration precision is evaluated by the confirmation patch which is same as the calibration patch, the precision evaluation can be prevented from being influenced by the difference in the patch. As a result, the calibration precision can purely be evaluated. A model specified as the compensation for color shift due to difference in mats has been exemplified in the embodiment. Alternatively, the color difference may result from difference in another print/color measurement condition. For example, compensation for color difference due to difference in the print paper may be carried out without execution of threshold determination at S210. Furthermore, the above equations (1) to (3) may be applied to a color measurement value of calibration patch in the calibration process. In this case, calibration with high precision can be realized even when color measurement is carried out on an improper mat.

In the present invention represented by the foregoing embodiment, the confirmation patch maker prints a plurality of confirmation patches including a background patch whose dot record rate is 0. The reference value corresponding to each confirmation patch is known inclusive of the background patch. A color measurer color-measures the confirmation patches, thereby acquiring respective initial color measured values. A background color shift amount calculator calculates a first amount of background color shift between the reference values and the initial color measured values with respect to the background patches respectively. Since the background color shift amount is of the background patch in the case where the dot record rate is 0, it can be said to be a color shift amount which does not depend on the output characteristic of ink amount adjusted by the calibration. More specifically, since the aforesaid background color shift amount is not influenced by the calibration, it can be determined based on the aforesaid background color shift amount whether the print condition on which the patch maker has purely printed the confirmation patch and the color measurement condition on which the color measurer color-measured the confirmation patch are same as ideal print/color measurement condition which is the premise of the aforesaid reference value. Furthermore, it can also be determined that the background color shift amount is the color shift amount resulting from the difference in the print/color measurement condition. Accordingly, a corrector corrects the initial color measured values of the confirmation patches based on the background color shift amounts, thereby acquiring corrected color measured values compensating for the difference in the print/color measurement condition, respectively. In other words, influences of the aforesaid background color shift amount due to the difference in the print/color measurement condition can be subtracted from the initial color measurement value. Consequently, the precision evaluator can truly evaluate the calibration precision based on the remaining corrected color measured values.

Furthermore, as another embodiment of the invention, the corrector corrects the initial color measured values by an amount of correction according to an average value of the background color shift amounts. Consequently, an amount of correction according to the background color shift amount resulting from the difference in the print/color measurement condition is added to or subtracted from the aforesaid initial color measurement value, whereupon the corrected color measurement value with less amount of influence of difference in the print/color measurement condition.

Furthermore, as an optional embodiment of the invention, an amount of correction in the foregoing correction is increased with increase in the luminance and color saturation of the aforesaid corrected color measured value to be corrected. Since the difference in the background color shift amount becomes more remarkable with increase in the luminance and color saturation of the initial color measured value, an amount of correction is desirably rendered larger with increase in the luminance and color saturation of the initial color measured value.

Furthermore, as another embodiment of the invention, when background color shift amount is extremely large, it can be considered that the aforesaid print/color measurement condition has a serious defect. Accordingly, the amount of background color shift is determined to be in an abnormal condition. Consequently, the calibration precision can be prevented from being evaluated under an abnormal condition. Furthermore, as an optional embodiment of the invention, an absolute criterion for determination of an abnormal condition can be set up when determination is made for every component in an L*a*b* coordinate system with no machine dependency in determination of an abnormal condition.

Furthermore, as another embodiment of the invention, in the calibration, a plurality of calibration patches are printed which represent shading of a primary color with respect to each ink color. The ink amount output characteristic is adjusted, whereupon the calibration can be realized. Moreover, when the calibration patches and the confirmation patches have colors common to both patches, whether the corrected color measured value is approximate to the reference value which is the same as that in the calibration can be determined. Consequently, the results of calibration can be grasped more accurately.

Of course, the foregoing invention can be realized as a method of evaluating calibration precision as well as the device. Furthermore, the invention can also be realized as a calibration precision evaluation program on which processing according to the foregoing method is carried out. Furthermore, each of the device, method and program of the invention is independently practiced or incorporated in another device, method or program. Thus, the concept of the invention includes various embodiments and can suitably be changed.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A calibration precision evaluation apparatus comprising:
 a calibrator carrying out calibration to adjust an ink amount output characteristic so that a measured color value is approximated to a reference value;
 a confirmation patch maker printing a plurality of confirmation patches including a background patch with a dot recording rate of zero and having reference values which correspond to the respective confirmation patches and are known;
 a color measurer color-measuring the plurality of confirmation patches, thereby acquiring respective initial color measured values;
 a background color shift amount calculator which calculates a first amount of background color shift between a reference value of the background patch and an initial color measured value of the background patch;
 a corrector which corrects the initial color measured values of the plurality of confirmation patches based on the first amount of background color shift, thereby acquiring corrected color measured values, respectively; and
 a precision evaluator carrying out precision evaluation of the calibration based on a second amount of color shift between the corrected color measured values and the reference values with respect to the plurality of confirmation patches, respectively.

2. The apparatus according to claim 1, wherein the precision evaluator carries out the precision evaluation based on a mean value of the second amount of color shift between the corrected color measured values and the reference values.

3. The apparatus according to claim 1, wherein each of the initial color measured values to be corrected has a predetermined luminance and a predetermined color saturation, and as the luminance and color saturation become large, each initial color measured value is corrected by a larger amount.

4. The apparatus according to claim 1, wherein the first amount of background color shift is determined to be in an abnormal condition when larger than a predetermined threshold.

5. The apparatus according to claim 4, wherein the first amount of background color shift is calculated for every component in an L*a*b* coordinate system, and the first amount of background color shift is determined to be in the abnormal condition when at least one of the components is larger than the threshold.

6. The apparatus according to claim 1, wherein:
 in the calibration, a plurality of calibration patches are printed which represent shading of a primary color with respect to each ink color, and the ink amount output characteristic is adjusted so that a shift of each measured color value from the reference value is compensated; and
 the calibration patches and the confirmation patches have colors common to both patches.

7. A method of evaluating calibration precision, comprising:
 carrying out calibration to adjust an ink amount output characteristic so that a measured color value is approximated to a reference value;
 printing a plurality of confirmation patches including a background patch with a dot recording rate of zero and having reference values which correspond to the respective confirmation patches and are known;

color-measuring the plurality of confirmation patches, thereby acquiring respective initial color measured values;

calculating a first amount of background color shift between a reference value of the background patch and an initial color measured value of the background patch;

correcting the initial color measured values of the plurality of confirmation patches based on the first amount of background color shift, thereby acquiring corrected color measured values, respectively; and carrying out precision evaluation of the calibration based on a second amount of color shift between the corrected color measured values and the reference values with respect to the plurality of confirmation patches, respectively.

8. A calibration precision evaluating program which is stored on a computer readable tangible storage medium and is executable on a computer, the program realizing:

a calibration function of adjusting an ink amount output characteristic so that a measured color value is approximated to a reference value;

a confirmation patch printing function of printing a plurality of confirmation patches including a background patch with a dot recording rate of zero and having reference values which correspond to the respective confirmation patches and are known;

a color-measuring function of color-measuring the plurality of confirmation patches, thereby acquiring respective initial color measured values;

a background color shift amount calculating function of calculating a first amount of background color shift between a reference value of the background patch and an initial color measured value of the background patch;

a correcting function of correcting the initial color measured values of the plurality of confirmation patches based on the first amount of background color shift, thereby acquiring corrected color measured values, respectively; and a precision evaluating function of carrying out precision evaluation of the calibration based on a second amount of color shift between the corrected color measured values and the reference values with respect to the plurality of confirmation patches, respectively.

* * * * *